RECORDING MEMBER FOR VISIBLY RECORDING RADIO FREQUENCY MICROWAVES
Original Filed Dec. 5, 1960 2 Sheets-Sheet 1

INVENTORS
Harold C. Anderson
Kenneth E. Peltzer
BY Alfred B. Levine
ATTORNEYS

RECORDING MEMBER FOR VISIBLY RECORDING RADIO FREQUENCY MICROWAVES

Original Filed Dec. 5, 1960 2 Sheets-Sheet 2

INVENTORS
Harold C. Anderson
Kenneth E. Peltzer

BY Alfred B. Levine
ATTORNEYS 3,316,119
Patented Apr. 25, 1967

3,316,119

RECORDING MEMBER FOR VISIBLY RECORDING RADIO FREQUENCY MICROWAVES

Harold C. Anderson, Silver Spring, and Kenneth E. Peltzer, College Park, Md., assignors to Litton Systems, Inc., College Park, Md.

Original application Dec. 5, 1960, Ser. No. 73,695, now Patent No. 3,243,784. Divided and this application Nov. 1, 1961, Ser. No. 149,320
29 Claims. (Cl. 117—36.8)

This application is a division of copending application Ser. No. 73,695, filed Dec. 5, 1960, now Patent No. 3,243,784, and relates generally to the storage or conversion of a microwave radio beam into visible or other detectable form by solid state nucleonic technology. It is particularly concerned with the conversion of microwaves into a spatially dispersed two-dimensional heat pattern or other image form and the further conversion of this pattern into a visible form, all for such purposes as recording, storage, scanning, display and many others. The present application is concerned with a medium for recording, indicating, or otherwise displaying microwaves in the form of a visible image or marking.

In a prior application, Ser. No. 59,342, filed Sept. 29, 1960, now Patent No. 3,238,511, of the same inventor, there is disclosed processes for recording or otherwise converting a microwave intelligence signal into a detectable image on a tape or other record member by employing solid state technology. In such processes, spin resonant materials are dispersed over a given surface and preconditioned to resonance by the application of strong static magnetic fields, to absorb energy directly from the microwave intelligence signal and reradiate the energy in the form of heat or otherwise change its characteristics in a detectable manner. Upon exposure to the microwave signal, the dispersed resonant material produces a two-dimensional image over the surface representing various characteristics of the microwave signal. This image may be fixed or captured on the record by certain changes taking place in the sensitized mateial or it may be otherwise employed for useful purposes as is set forth in the prior application.

According to the present invention, there is provided a different manner of dispersing the spin resonant material over the extended surface region of a tape drum or other record member which differs from the steps of the process as set forth in the prior application by enabling either liquid, solid or gaseous spin resonant materials to be employed. Additionally, there is disclosed a series of further steps in the process and a number of variations in the materials for further converting a heat image produced into a visible form. Some of these additional steps may be employed with both the process steps of the prior application and the different steps of the present invention, whereas other of these additional steps may be employed only with the process of the present invention.

It is accordingly a principal object of the invention to provide processes for converting a time variable microwave intelligence signal into a two-dimensional space image in visible or other detectable form.

A further object is to provide such processes for converting a broad frequency band of such microwave signals into other usable forms.

A still further object is to provide such processes employing solid state nucleonic converting means.

Still another object is to provide such conversions directly from the microwave energy beam without the need for an intermediate transducer means.

A still further object is to perform such conversion processes either temporarily or permanently.

Other objects and many additional advantages will be more readily comprehended by those skilled in the art after a detailed consideration of the following specification taken with the accompanying drawings wherein.

Figure 1:
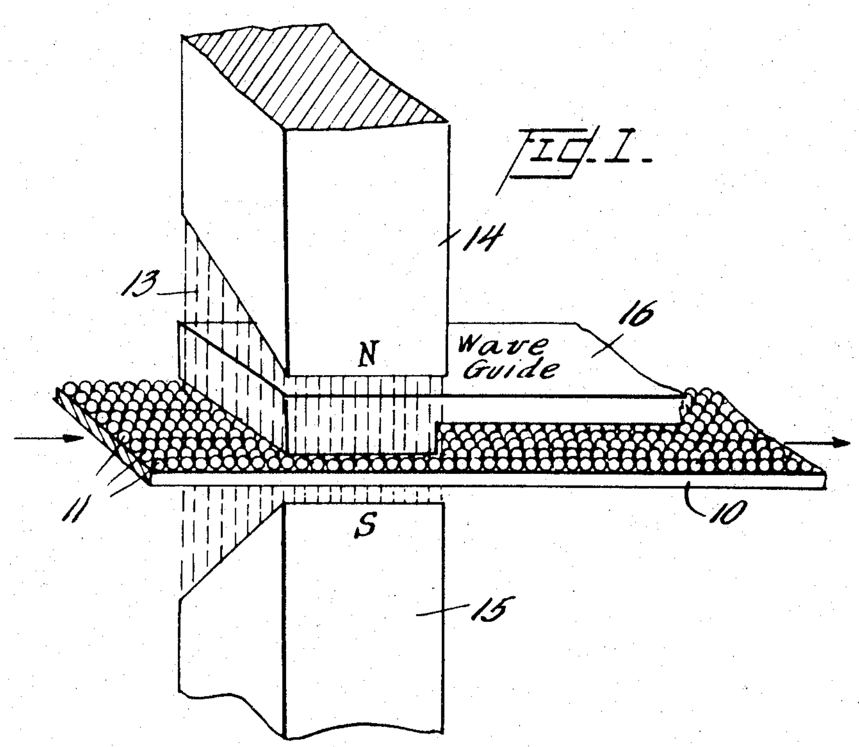
FIG. 1 is a perspective view illustrating the application of one process for recording microwaves according to the invention.
Figure 2:
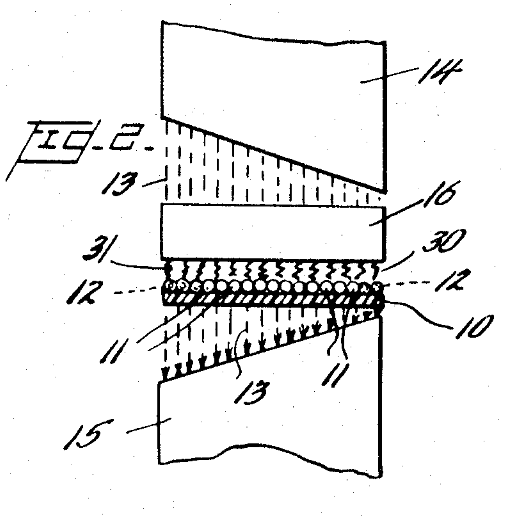
FIG. 2 is a sectional view of FIG. 1 observed from the left hand side thereof.

Referring now to the drawings for a detailed consideration of one preferred process and materials according to the present invention for recording a microwave radio beam, there is shown in FIGS. 1 and 2 a ribbon or base supporting member 10 which may be made of Mylar or other suitable base material, either rigid or flexible, over the surface of which is dispersed a plurality of small hollow spheres 11 that may be formed of wax or other material as will be discussed more fully hereinafter. Each of the hollow spheres 11 contains a suitable spin resonant material 12, in liquid, solid, or gaseous form, that is capable of providing free or uncoupled electrons, protons, or other subatomic particles therein that possess dipole moments. In the material 12 contained in any one sphere 11 there may be a considerable number of uncoupled subatomic particles therein, and the uncoupled or unstable particles in each sphere 11 are effectively isolated or separated from those in the other spheres 11 by the walls of the individual spheres 11 enclosing each discrete portion of the spin resonant material 12.

After preparation of the record member in this manner, a region on the record is then subjected to a static magnetic field 13, as shown, by such means as being introduced between the opposing poles 14 and 15 of a magnet of suitable strength as generally illustrated. The static field 13 orients the magnetic dipoles in the material 12 into alignment with one another and with the field 13 and serves to tune the dipoles into energy absorptive relationship with an electromagnetic wave in the manner of a resonant circuit to absorb energy from the wave. It has been found that the resonant frequency of the material 12 may be "tuned" or varied over a relatively wide frequency band by varying the intensity of the magnetic field 13 and that the relationship between the resonant frequency of the material 12 and the intensity of the magnetic field is substantially linear over the band width, according to the Zeeman energy relationship.

Considering this phenomena in greater detail, it is known in quantum mechanics theory that uncoupled subatomic particles in a spin resonant material behave in the manner of a resonant circuit in response to a polarized microwave beam occurring at the resonant frequency thereof to absorb energy from the wave. Some of the absorbed energy is transformed into heat through two physical phenomena. These phenomena are variously known as spin-spin or spin-lattice relaxation effects or others depending upon the material employed. The spin resonant material 12 responding in this manner absorbs energy from the microwave and converts the energy into a different form. In some materials, the energy absorbed by the uncoupled particles is dissipated in the form of heat by raising the temperature of the material and its surrounding environment. In other materials, the energy being absorbed from the microwave may raise the energy level of the uncoupled particle from the valence band to the conduction band.

Thus by preparing a record number as described and subjecting the spheres 11 in a given region thereof to a static magnetic field 13 of predetermined intensity, the region of the record subjected to the field is sensitized or tuned to resonance or energy absorbing relationship with a polarized microwave radio beam occurring at the resonant frequency as determined by the strength or intensity of the static field.

Figure 3:
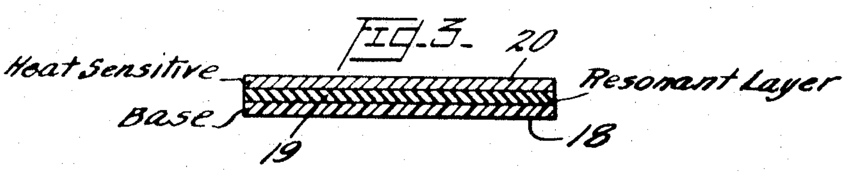
FIG. 3 is a sectional view illustrating a different construction of the recording tape or record member.

For recording a given microwave signal, the "tuned" area or region of the tape is then directly exposed to a polarized beam 31 of the microwave signal, which beam may be introduced by a wave guide 16 or the like, and directed along the oriented axes of the tuned dipoles as shown in FIGS. 1 and 2. The polarization of the microwave beam is controlled such that its H component is made transverse to that of the static magnetic field 13. Upon exposure to the beam 31 the spheres 11 in the given region of the tape 10 that have been polarized and pretuned to the frequency of the microwave will absorb energy from the microwave beam 31 to produce heat or otherwise change their condition. Since the spheres 11 are spatially dispersed along the length and width of the tape 10 in the region exposed, the microwave signal 31 produces a two-dimensional spatially dispersed heat pattern or other detectable pattern of the beam 31 along the length and width of the region exposed.

Where the microwave radio beam is in the form of a modulated signal or otherwise carrying intelligence, it is desired to record each of the frequency components of the wave to capture the intelligence as an image on the tape. To perform this function, the tape 10 is subjected to a non-uniform static magnetic field 13 by such means as placing the tape 10 transversely between progressively diverging pole pieces 14 and 15 of the magnet, as best shown in FIG. 3. Accordingly, those regions on the tape at the right in FIG. 2, that lie between the closely spaced ends of the magnet pole pieces 14 and 15 are subjected to a greater intensity static magnetic field 13 and are accordingly sensitized or tuned to resonate at higher frequency components whereas those regions on the tape at the left in FIG. 2, that lie between the more widely spaced apart ends of the poles 14 and 15 are subjected to the lowest intensity magnetic field 13 and are accordingly sensitized or tuned to resonate at the lower frequency components of the microwave beam. Thus by providing a spatially non-uniform magnetic field 13 that progressively increases in intensity across the tape from the left to the right sides thereof, different frequency components in the microwave beam may be captured or recorded at different positions across the tape.

By preparing and energizing the tape in this manner, when the tape 10 is subjected to a microwave beam 31 having integral components thereof being at different frequencies, a spectral distribution of the frequency components is imaged on the tape, with the higher frequency components being recorded progressively toward the right of the tape and the lower frequency components progressively toward the left of the tape. For example, if the tape is exposed to an amplitude modulated microwave beam 31 being introduced through the waveguide 16, the radio beam frequency components include a carrier frequency component together with upper and lower side band components. The central regions on the tape 10 may be tuned by the static field 13 to resonate at the carrier frequency and the opposite side regions on the tape progressively tuned toward the higher frequency of the upper side band and the lower frequency of the lower side band, respectively, whereby each of the different frequency components of the beam 31 are each recorded at a different transverse position on the tape.

In a similar manner, different spatial positions along the tape may be tuned in any predetermined uniform or non-uniform pattern desired to record a complex frequency code or other form of intelligence, by providing a non-uniform static magnetic field configuration having the spatial pattern desired. Thus, upon exposing the presensitized tape 10 to the microwave beam 31 introduced through waveguide 16, a two-dimensional pattern or image of the time variable beam 31 is produced on the tape with the different frequency components in the beam being captured at different spatial positions on the tape.

According to the present invention, there is provided a number of additional steps in the process to produce a visible image of the recorded intelligence on the tape by further converting the heat image produced into an optically detectable form.

According to one preferred embodiment, the hollow spheres 11 may be formed of wax or other suitable material that is adapted to melt when the sphere is heated. A suitable dye-stuff or coloring material is also incorporated within each wax sphere 11 in addition to the spin resonant material. Upon exposure to the microwave beam 31, the heat being generated within each sphere 11 that is tuned to the frequency of the wave serves to melt the enclosing wax capsule 11 and permits escape of the dye-stuff or coloring material from the capsule to provide a color marking on the tape at that position of the tape where the capsule has melted. Since only those capsules of material 12 that are tuned to the frequency of the microwave beam 31 will absorb energy from the beam and become heated, the resulting coloring or marking of the tape 10 provides a two-dimensional optical image of the microwave beam corresponding to the heat image. In this embodiment, the wax or other heat-meltable capsule or sphere would preferably be of an optically opaque coloring with the dye-stuff or coloring matter therein being of a different color to distinguish over the coloring of the wax spheres.

In the event that sufficient energy is not obtained from the microwave beam to melt the spheres 11, the tape may be initially pre-heated to a temperature just below the melting temperature of the spheres whereupon the exposure of the different spheres to the microwave beam produces the necessary added amount of heat to melt the spheres affected.

Instead of employing a coloring material or dye within an opaque heat-meltable sphere, another manner of converting the heat image into visible form is by incorporating a suitable acid or base material within each sphere in addition to the spin resonant resonance material 12. After dispersing and affixing a plurality of such spheres 11 over the surface of the tape, a suitable litmus paper covering or similar indicator such as phenolphthalein or other suitable material that may react with the acid or base may then be coated or otherwise applied over the spheres as indicated at 30 in FIG. 4. In this variation, the heat being generated by the absorption of the microwave beam serves to melt the particular spheres 11 that are tuned to the frequency of the beam thereby releasing the acid or base material within and permitting its contact with the litmus or other indicator covering 30. The interaction of the acid with the litmus coating 30 produces a change in the color of the litmus covering, as is well known in the art, thereby to render visible those areas on the tape that have been affected by the microwave beam.

A large number of other inter-acting chemical materials such as those used for chemical titration and which produce a color change may also be employed in the same manner, with one of the reacting materials being incorporated inside the wax or heat-meltable spheres 11 and with the other reacting material being deposited as a layer or coating 30 on the outside of the spheres 11. Upon melting of the capsules, the two reacting chemical materials are brought into intimate contact producing the desired change in the coloring of the surface, thereby to convert the heat image into an optically visible form.

FIG. 3 illustrates a further variation in the means for converting the heat image into optically detectable form. As shown, the tape or record member may be comprised of a suitable base 18, and an overlying layer 19 of spin resonant material may be applied thereover as either a continuous or discontinuous coating or impregnation in the base 18. Superimposed as a further coating or layer over the resonant material layer 19 is provided an upper layer 20 of heat sensitive material, which upon exposure to heat varies its color or color density. A vast number of such heat responsive materials are known to those skilled in the art and variously termed heat sensitive, heliotropic, and the like.

After presensitizing the record member 17 by the static magnetic field and exposing the record 17 to the microwave beam in the same manner as in the embodiment of FIG. 1, a two-dimensional heat pattern is formed in the resonant layer 19, which heat pattern is in intimate direct contact with the heat sensitive layer 20 whereby the heat pattern is reproduced as a visible image in the heat layer by variously changing the coloration density over the surface of the heat responsive layer 20 corresponding to the microwave image.

One suitable material that may be employed as a heat sensitive coating 20 in this embodiment may be formed by combining the following materials in the relative proportions indicated:

| | Grams |
|---|---|
| Nickel acetate | 6 |
| Thio-acetamide | 5 |
| Acetic acid | 0.5 |
| Water | 100 |

The temperature at which this above coating will change color may be varied by changing the proportion of acid content. Further characteristics of this material may be found in Patent 1,880,449. A rather large number of other materials are known that will permanently change color in response to the application of heat and the above example should be accordingly considered as illustrative of such materials rather than limiting the materials that may be employed for this purpose.

A number of such heat sensitive materials are also known that reversibly vary their color or color density in response to heat and after cooling of the material, revert to the original color condition. Depending upon the particular application of the process, these reversible color changing materials may be preferred over those that irreversibly change in color in response to heat. Examples of such color reversible materials are set forth in U.S. Patent No. 2,261,473. A suitable coating of this type may be made by combining by weight 98% caproic acid and 2% Iodeosine (Erythrosin B).

Figure 4:
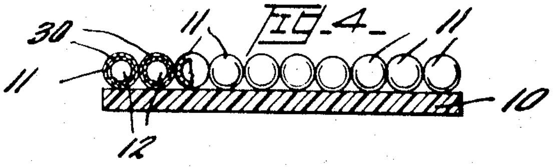
FIG. 4 is a view similar to FIG. 3 and illustrating a further alternative tape or record member construction.

Still a further modification of the record member that enables the conversion of the heat image into optically visible form may be provided by a variation in the embodiment of FIG. 4. In this embodiment, the tape or record member may be first prepared as in either FIG. 1 or FIG. 4 and comprise a base or underlying layer 10 together with a plurality of hollow capsules or spheres 11 containing spin resonant material 12, which capsules are dispersed over the surface of the base 10. These individual capsules 11 may then be coated, sprayed, or otherwise provided with a heat sensitive material, such as discussed above, that is adapted to vary its color or color density in response to heat. However, in this modification, the capsules 11 are not adapted to be melted upon exposure to the microwave beam but merely to be heated by the absorption of energy in the material 12 from the microwave beam sufficiently to rise in temperature and vary the color density of the outer layer thereon of heat sensitive material. If desired, the capsules 11 may be formed of a wax or other suitable material having integrally incorporated therein a suitable heat sensitive optical material of the type described whereby the coloring of the capsule 11 itself varies upon the capsule being heated by the absorption of microwave energy.

Figure 5:
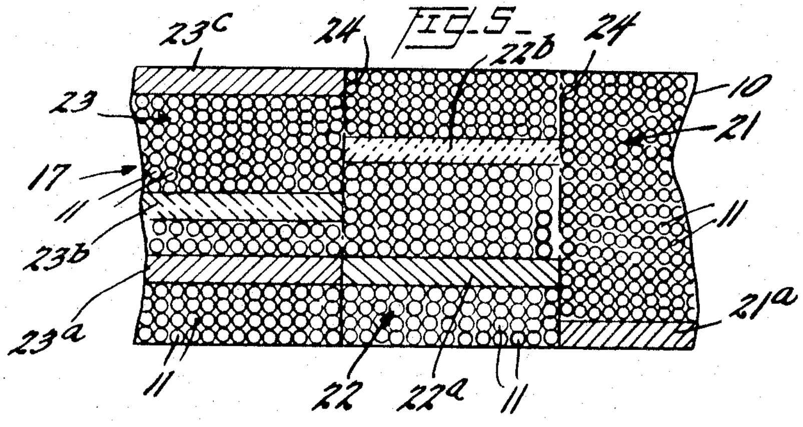
FIG. 5 is a plan view of a recording tape or record after the recording of a microwave signal and illustrating the optically visible pattern thereon.

FIG. 5 schematically illustrates a record member according to the above processes of FIGS. 1 or 4 after being exposed to the microwave signal and presenting optically visible images of the signal. As shown, the tape 17 or other record member is preferably elongated along its length to provide a series of successive time images of the microwave beam as the tape is moved lengthwise past the recording zone, as shown in FIG. 1. For purposes of illustration, three different recorded images or frames are shown in FIG. 5 and labeled successively, from right to left, 21, 22, and 23, with the three regions or frames shown as being separated by dotted lines 24. It will be understood that no such dotted line separation between the regions or frames is obtained in actual practice of the invention.

As will be recalled from the above discussion, the different frequency components in the microwave beam are recorded at different positions transversely across the tape, with the lower frequency components being recorded at one side portion thereof, the upper frequency components at the other side portion thereof, and the intermediate frequency components being recorded between the two side portions. Consequently, in the example illustrated in FIG. 5, the first region or frame 21 has been exposed to only a single lower frequency signal component, shown as being recorded in the cross-hatched section **21*a*, whereas in the second frame or region 22, the microwave signal recorded consists of two different frequency components recorded at positions 22*a* and 22*b*, both frequency components being at a greater frequency than the frequency component 21*a* in the first frame. In the third frame 23, the microwave signal recorded consists of three different frequency components with the lower frequency component 23*a* being at the same frequency as component 22*a* in the second frame and with two additional frequency components 23*b* and 23*c*** being at different frequencies than the components in either the first or second frames.

Thus, as is illustrated in FIG. 5, the microwave signal is recorded in the frequency domain on the tape or record member 17, with the different component frequencies in the signal being recorded at different positions transversely across the record. Consequently, the recorded image at any given time or frame captures the complete waveform including the fundamental frequency and all sidebands thereof within the tuned bandwith of the tape.

In addition to distinguishing between the different frequency components in the microwave signal, the recorded image further distinguishes between the relative amplitudes of these component frequencies. This results from the fact that in the heat image being developed on the tape, the intensity of the heat produced at each different position is a function of the intensity of that frequency component of the microwave beam being absorbed at that position on the tape. Within a given range, the greater the intensity of the microwave frequency component being generated, the greater is the amount of energy being absorbed by that resonant region on the tape, and consequently the greater is the amount of heat being produced in that region. By providing a heat sensitive material or layer in intimate contact with the resonant material, as described above, which material variably changes color density in proportion to the intensity of the heat, the degree of coloration of the different recorded regions also indicates the relative intensity of that component frequency of the microwave beam. Consequently, according to the present invention there is provided a process for recording the complete waveform of the microwave beam as a spectral frequency distribution across a record, whose spectral components further vary in color intensity from region to region in proportion to the relative intensity of the different frequency components of the microwave beam.

Figure 6:
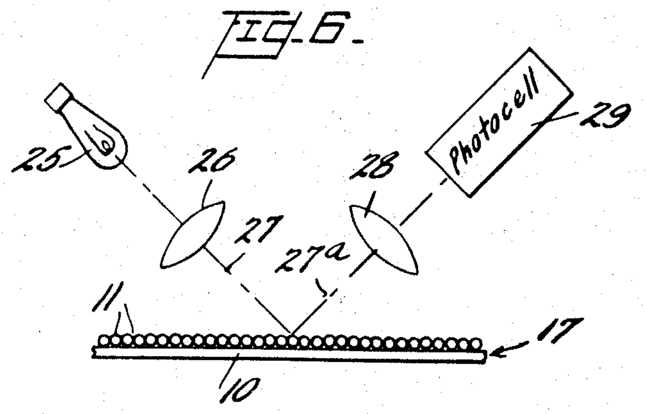
FIG. 6 is a diagrammatic illustration of a typical optical read-out system that may be employed according to the invention.

As generally illustrated in FIG. 6, the visible image being produced on the record by the process steps described, may be read-out or reproduced by any suitable optical read-out system, such as the photocell system shown. In this system, a light beam 27 being produced by a suitable light source 25 and focused by a suitable lens system 26 is directed to scan the surface of the recorded tape or record member 17. The reflected light beam 27a being received from the record member 17 and intensity modulated according to the varying colorations is, in turn, focused by means of a receiver lens system 28 or the like and directed to a photocell 29 or other optical pickoff where the information is converted into electrical form for read-out purposes. It is to be understood, of course, that many other optical read-out systems known in the art may be employed for scanning the color variations in the optically distinguishable image on the record and converting the optical image into electrical or other desired form for display or utilization as desired.

In forming the tape, one group of spin resonant materials 12 that may be encapsulated within the spheres 11 and function in the manner described are various of the free radical materials such as the radicals of ethyl, methyl, propyl, and hydroxyl. The free radicals, as is well known, are fragments of molecules having uncoupled electrons providing strong magnetic dipole moments, which respond to a static magnetic field in the manner discussed above to resonate at different frequencies related to the intensity of the magnetic field. Present quantum theory explains the phenomenon of interaction between the dipoles, static field, and microwave as resulting from the fact that the applied static field causes the electron energy levels in the material to be split into sublevels. At the resonant frequency the absorbed energy raises the electron to higher excited states. One of the suitable free radicals is diphenylpicrylhydrazyl, which is an organic free radical containing an unpaired electron spin.

The relationship between the resonant frequency of these materials and the intensity of the magnetic field is known as the Zeeman energy relationship, represented as follows:

$$F=2.8H$$

where F is the frequency expressed in megacycles and H is the strength of the magnetic field expressed in gauss.

Applying this formula, it is noted that by subjecting this material to a magnetic field of 10,000 gauss serves to presensitize or tune the material to resonate at a frequency of 28 kilomegacycles. Permanent magnets are readily available on the open market having strengths extending to 14,000 gauss or better and consequently the process as described above may be employed to record frequencies up to approximately 52 kilomegacycles using these free radical materials. To extend the frequency range even higher, electromagnets may be employed for producing stronger static magnetic fields as is well known to those skilled in the art.

Many other free radicals are obtainable and may be employed according to the present invention. For example, a number of free radicals are obtainable at lower temperatures and super-conductive temperatures and the tape or record member 10 may be prepared with such materials at these lower temperatures, if desired. For example, if hydrozoic acid is decomposed hydrothermally or electrically and the products of decomposition are cooled to 77° Kelvin, a deep blue solid condenses that is stable at this temperature and contains the free radical desired. If this free radical material is heated to 148° Kelvin or above, the deep blue solid condensate becomes white, and the resonance condition disappears. Consequently, a sensitized record material may be prepared by decomposing this acid at 77° Kelvin to obtain the free radical material and encapsulating the material within a plurality of discrete spheres 11 as described above and uniformly dispersing the spheres over the surface of the tape 10, while maintaining the tape and the spheres thereon at this temperature.

Many of the free radical materials can be dissolved in a solute such as benzene to produce a liquid or fluid form thereof, and this fluid may be readily incorporated within spheres of wax or other suitable material by processes well known to those skilled in the art. Upon exposing the presensitized free radical materials to the microwave beam, the heat being produced by absorption of energy from the microwave beam destroys the resonance condition of the material by causing a catastrophic decay of the spin system.

The free radical materials discussed appear particularly well suited for recording and storage purposes according to the invention due to the further fact that some of these materials possess a very narrow resonant band-width, and such materials may be tuned by the static magnetic fields to resonance over a wide frequency band ranging from about 1,000 megacycles to about 50,000 megacycles.

Other groups of materials which may employed to form the resonant areas 12 within the spheres 11 are the colloidal metals which comprise very finely divided metals such as sodium, which may be deposited and bedded in a wax or other body or carried by a suitable fluid that is encapsulated within individual spheres 11. Materials such as graphite compounds of alkali of alkali earth metals, comprising alkali metals dissolved and dispersed in graphite may also be employed, as may the known maser crystal materials such as garnets that are super-cooled to substantially zero conditions.

As described in the prior application of the same inventors, mentioned above, a relatively large number of other semi-conductors or insulator materials such as various of the crystals materials may likewise be employed that are capable of producing orbiting electrons or other uncoupled subatomic particles after being irradiated by high energy X-rays, neutrons, ultra-violet rays or other radiation. The radiation produces F-centers or V-centers in the crystal materials which may be tuned to resonate at microwave frequencies by a static magnetic field.

It will be apparent to those skilled in the art that other variations may be made in the process steps disclosed and in the materials employed without departing from the spirit and scope of the invention. For example, although wax has been disclosed as one suitable material for the hollow spheres or capsules, many other thermoplastic and heat meltable materials are known that may be employed for this purpose. Similarly other methods of applying a color changing heat responsive substance to the microwave resonant material may be followed, permitting the heat image to be converted into optical form. One such alternative is to encapsulate such a heat responsive substance within a transparent capsule of wax or the like together with the resonant material. When the resonant material is heated, the color change produced in the substance is visible through the transparent walls of the capsule.

Since these and many other variations may be made without departing from the teachings of this disclosure, this invention should be considered as being limited only by the following claims.

For purposes of the present invention, a spin resonant material is defined as being a frequency sensitive material that responds in energy absorptive relationship to a radio wave or varying magnetic field in the microwave band of frequencies to produce heat in the material. Such material is frequency tunable to different frequencies in the microwave radio band in proportion to the amplitude of a static or low frequency magnetic field being applied to the material with the radio frequency wave or magnetic field. The relationship between the amplitude of the static or low frequency magnetic field and the frequency of response of the material being the Zeeman energy relationship; namely, $$F=CH$$

where F is the frequency of response of the material, C is a constant, and H is the amplitude of the applied magnetic field to tune the material.

What is claimed is:

1. A recording member for radio frequency microwaves comprising an elongated record member, a plurality of small capsules dispersed along said member in at least two dimensions, each capsule containing a spin resonant material that is frequency sensitive and absorptive of energy from the radio frequency to microwaves to produce heat and optical indicator means associated with the capsules on the recording member to optically indicate the selective regions on the tape where the heat is produced.

2. In the article of claim 1, said capsules being of heat meltable material.

3. In the article of claim 1, said indicator means being a substance that is sensitive to heat to vary color density thereof.

4. In the articles of claim 1, said capsules being of heat meltable material and said indicator means being a substance that is optically distinguishable from the capsule material when the capsule melts, thereby to indicate the melted condition thereof.

5. In the article of claim 1, said capsules being of heat meltable material and having a coloring substance therein.

6. In the article of claim 1, said capsules having a coating of substance thereon that is sensitive to heat to vary its color density.

7. In the article of claim 1, said indicator means comprising a first reacting substance within said capsules, and a second reacting substance on the outside thereof, which first reacting substance and second reacting substance interact when brought into contact to vary the color condition thereof, and said capsules being formed of heat meltable material.

8. In the article of claim 1, said capsules containing a liquid spin resonant material.

9. In the article of claim 1, said capsules containing a solid spin resonant material.

10. In the article of claim 1, said capsules containing a gaseous spin resonant material.

11. In the article of claim 1, said capsules containing a free radical material.

12. In the article of claim 1, said capsules containing an irradiated crystalline material.

13. In the article of claim 1, said capsules containing a material having uncoupled subatomic particles at supercooled temperatures, and said recording member being supercooled.

14. In the article of claim 1, said capsules containing an irradiated material having uncoupled subatomic particles consisting of colloidally suspended metals.

15. In the article of claim 1, said optical indicator means comprising a substance that is variably heat sensitive to change color density in proportion to heat intensity.

16. In the article of claim 1, said optical indicator means comprising a substance within said capsules that is sensitive to heat to permanently change color density thereof.

17. In the article of claim 1, said optical indicator means comprising a substance within said capsules that is sensitive to heat to reversibly change color density thereof.

18. In the article of claim 1, said optical indicator means comprising a mixture of substances within said capsules that change color density in response to heat.

19. A recording member for microwaves comprising an elongated record member, a spin resonant material supported by said record member, and a heat sensitive substance supported in intimate heat transferring relationship to said spin resonant material, said heat sensitive substance being characterized by varying its color density in response to heat.

20. In the recording member of claim 19, said spin resonant material and said heat sensitive layer material being dispersed over said member as a first and second layer thereon, with the two layers being in heat transferring relationship.

21. In the recording member of claim 1, said record member being premagnetized by a magnetic field of nonuniform intensity.

22. In the recording member of claim 19, said record member being premagnetized by a magnetic field of nonuniform intensity.

23. In the recording member of claim 19, said spin resonant material being coated with said heat sensitive material.

24. In the recording member of claim 19, said spin resonant material being intimately mixed with said heat sensitive material.

25. A recording member for microwaves comprising an elongated record member, a container supported on said member, said container being transparent both to radio frequency microwaves and light waves, said container enclosing a microwave sensitive spin resonant material and a heat sensitive substance that responds to heat to vary its color density.

26. In the recording member of claim 25, said heat sensitive substance being characterized as color reversible whereby upon the removal of heat, the substance reverts to its initial color density.

27. In the recording member of claim 25, said heat sensitive substance being characterized as being variably heat sensitive to progressively change coloring responsive to the intensity of heat.

28. In the recording member of claim 25, a plurality of said containers being dispersed over said record, all containers being substantially the same size and each occupying but a small fraction of the recording member.

29. A recording medium for recording radio frequency signals in the microwave band as an optically detectable image comprising the combination of: a substrate, a spin resonant material supported by the substrate and responsive to the signals for producing a heat pattern, and an optical indicator means supported by the substrate for providing an optically detectable pattern corresponding to the heat pattern produced in the spin resonant material.

References Cited by the Examiner

UNITED STATES PATENTS

| | | | |
|---|---|---|---|
| 2,700,147 | 1/1955 | Tucker | 340—173 |
| 2,952,503 | 9/1960 | Becker | 346—74 |
| 2,953,454 | 9/1960 | Becker | 117—36.3 |
| 2,970,534 | 2/1961 | Marron | 117—36.7 |
| 2,971,916 | 2/1961 | Schleicher et al. | 117—36.1 |
| 2,984,782 | 5/1961 | Dicke | 324—.5 |
| 3,016,308 | 1/1962 | Macaulay | 117—36.1 |
| 3,020,171 | 2/1962 | Bakan et al. | 117—36.8 |
| 3,152,321 | 10/1964 | Peltzer et al. | 117—36.8 |

FOREIGN PATENTS 828,983 2/1960 Great Britain.

MURRAY KATZ, *Primary Examiner.*